(12) United States Patent
Mawhinney

(10) Patent No.: US 10,232,776 B2
(45) Date of Patent: Mar. 19, 2019

(54) DISPLAY SYSTEM FOR MIRROR-LESS DRIVING

(71) Applicant: Continental Automotive Systems, Inc., Auburn Hills, MI (US)

(72) Inventor: Nicholas L Mawhinney, Linden, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 563 days.

(21) Appl. No.: 14/541,574

(22) Filed: Nov. 14, 2014

(65) Prior Publication Data

US 2016/0137129 A1    May 19, 2016

(51) Int. Cl.
*B60R 1/00* (2006.01)
*H04N 7/18* (2006.01)

(52) U.S. Cl.
CPC .......... *B60R 1/006* (2013.01); *B60R 1/00* (2013.01); *H04N 7/18* (2013.01); *B60R 2300/10* (2013.01);
(Continued)

(58) Field of Classification Search
CPC ..... B60R 1/00; B60R 2001/1253; B60R 1/12; B60R 2300/105; B60R 2300/205; B60R 1/04; B60R 2300/8026; B60R 2300/8046; B60R 11/0235; B60R 11/04; B60R 2001/1215; B60R 2300/70; B60R 1/08; B60R 2300/20; B60R 2300/802; B60R 2011/0028; B60R 2300/8066; B60R 2011/0094; B60R 2300/806; B60R 2300/106; B60R 2300/303; B60R 2300/406; B60R 2300/8006; B60R 2001/1223; B60R 2300/207; B60R 2300/30; B60R 2300/607; B60R 2001/1276; B60R 2001/1284; B60R 2011/0082

See application file for complete search history.

(56) References Cited

U.S. PATENT DOCUMENTS 7,126,583 B1 * 10/2006 Breed ............... B60K 35/00 345/158
2003/0151563 A1 * 8/2003 Kulas ............... B60K 35/00 345/7

(Continued)

FOREIGN PATENT DOCUMENTS

CN     202923495 U     5/2013
CN     203651610 U     6/2014

(Continued)

OTHER PUBLICATIONS

Search Report dated Jun. 24, 2015, from corresponding GB Patent Application No. GB1500468.2.

*Primary Examiner* — Anand S Rao
*Assistant Examiner* — Samuel D Fereja

(57) ABSTRACT

A display system for a vehicle includes a rear view camera constructed and arranged to obtain images external to the vehicle and associated with a rear of the vehicle. At least one side view camera is constructed and arranged to obtain images external to the vehicle and associated with a side of the vehicle. A display is constructed and arranged to display the images to a driver of the vehicle so that the driver can see what is occurring at the rear and the side of the vehicle without using mirrors.

6 Claims, 3 Drawing Sheets

(52) U.S. Cl.
CPC ..... *B60R 2300/20* (2013.01); *B60R 2300/406* (2013.01); *B60R 2300/8046* (2013.01)

(56) References Cited

U.S. PATENT DOCUMENTS

| | | | |
|---|---|---|---|
| 2008/0051946 A1* | 2/2008 | Breed | B60C 11/24 701/1 |
| 2008/0239080 A1 | 10/2008 | Moscato | |
| 2009/0140845 A1* | 6/2009 | Hioki | B60K 35/00 340/425.5 |
| 2009/0225434 A1* | 9/2009 | Nicholas | B60R 1/00 359/630 |
| 2009/0284598 A1* | 11/2009 | Busch | B60R 1/00 348/148 |
| 2010/0253918 A1* | 10/2010 | Seder | G01S 13/723 353/13 |
| 2012/0092498 A1* | 4/2012 | Kanning | B60R 1/12 348/148 |
| 2012/0242724 A1* | 9/2012 | Kurozuka | G02B 27/01 345/697 |
| 2013/0038730 A1* | 2/2013 | Peterson | B60R 1/00 348/148 |
| 2014/0091988 A1* | 4/2014 | Masuda | G02B 27/0149 345/7 |
| 2014/0098008 A1* | 4/2014 | Hatton | G06T 11/00 345/8 |
| 2014/0168608 A1* | 6/2014 | Disley | G03B 29/00 352/132 |
| 2014/0307094 A1 | 10/2014 | Sheu | |
| 2014/0340516 A1* | 11/2014 | Vojtisek | B60R 1/00 348/148 |
| 2014/0362448 A1* | 12/2014 | Yamada | G02B 27/0101 359/631 |
| 2015/0042797 A1* | 2/2015 | Alam | B60R 11/04 348/148 |
| 2015/0092118 A1* | 4/2015 | Hada | G03B 21/2033 349/11 |
| 2015/0149079 A1* | 5/2015 | Breed | G01C 21/365 701/428 |
| 2015/0170343 A1* | 6/2015 | Kwak | G02B 27/0101 345/647 |
| 2015/0226964 A1* | 8/2015 | Sasaki | G02B 27/0149 359/631 |

FOREIGN PATENT DOCUMENTS

| | | |
|---|---|---|
| DE | 102012016773 A1 | 2/2014 |
| EP | 2743133 A2 | 6/2014 |
| JP | 2011213186 A * | 10/2011 |
| KR | 20-2010-000881 U | 9/2010 |

* cited by examiner

DISPLAY SYSTEM FOR MIRROR-LESS DRIVING

BACKGROUND

Embodiments of the invention relate generally to a viewing side and rear images while driving a vehicle and, more particularly, to a display system for displaying rear and/or side views images to a driver operating a vehicle without the use of mirrors.

Conventional vehicles include a windshield-mounted rear view mirror for viewing objects at the rear of the vehicle, and side view mirrors, one mounted to the driver side and another mounted to the passenger side of the vehicle for viewing images at the sides of the vehicle. Since the side view mirrors extend from the sides of the vehicle, they are susceptible to damage when backing out or entering a home garage. Also, the mirrors add parts, weight, and thus cost to vehicle.

Thus, there is a need to provide a display system for viewing side and rear images while driving a vehicle, thereby eliminating the use of mirrors.

BRIEF SUMMARY

An objective of embodiments of the invention is to fulfill the need referred to above. In accordance with the principles of an embodiment, this objective is obtained by providing a display system for a vehicle having a rear view camera constructed and arranged to obtain images external to the vehicle and associated with a rear of the vehicle. At least one side view camera is constructed and arranged to obtain images external to the vehicle and associated with a side of the vehicle. A display is constructed and arranged to display the images to a driver of the vehicle so that the driver can see what is occurring at the rear and the side of the vehicle without using mirrors.

In accordance with another aspect of an embodiment a display system for a vehicle is provided. The vehicle has windshield, a driver side window, and a passenger side window. The system includes a rear view camera constructed and arranged to obtain images external to the vehicle and associated with a rear of the vehicle. An image receiving area is associated with the windshield. A controller is associated with the rear view camera and is constructed and arranged to cause the images to be displayed on the image receiving area so that a driver of the vehicle can see what is occurring at the rear of the vehicle without using a rear view mirror.

In accordance with yet another aspect of an embodiment, a method displays external information to a driver of a vehicle. The vehicle has a windshield and a rear view camera. The method provides an image receiving area. Images external to the vehicle and associated with a rear of the vehicle are obtained from the rear view camera. The images are displayed on the image receiving area so that a driver of the vehicle can see what is occurring at the rear of the vehicle without using a rear view mirror.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION

Figure 1:
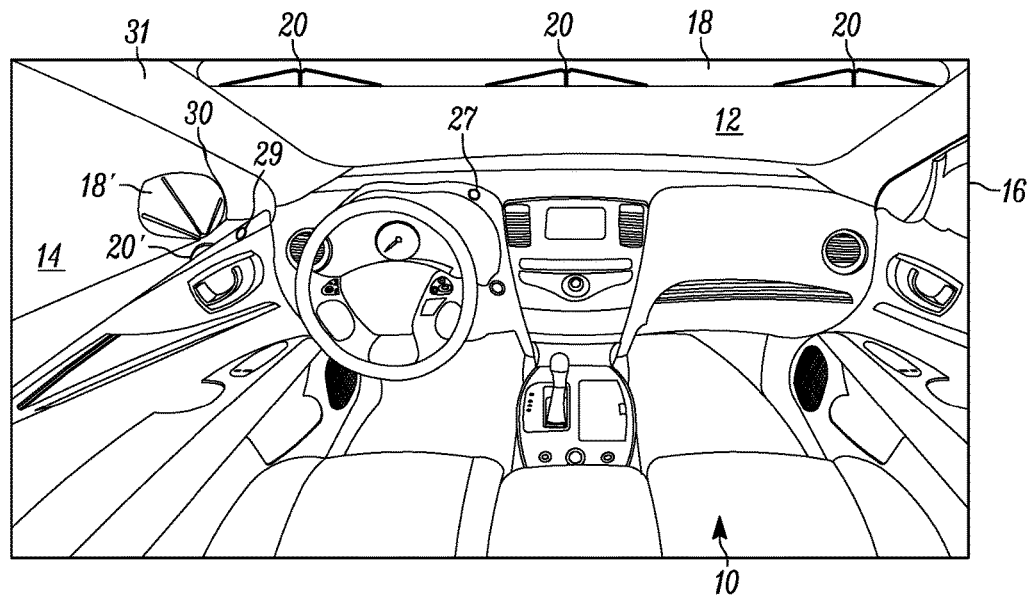
FIG. 1 is an interior view of a vehicle having image receiving areas on the windshield and at least on the driver side window, along with associated image projectors in accordance with an embodiment.

With reference to FIG. 1, an interior of a vehicle, shown generally indicated at 10, has a windshield 12, a driver side window 14, and a passenger side window 16. In the embodiment, no mirrors (e.g., rear view or side view) are provided on the vehicle 10. A first image receiving area 18 is provided in or on the glass near the top of the windshield 12 and a second image receiving area 18' is provided in or on the glass of the driver side window 14, generally where a conventional side mirror would be viewed. An image receiving area similar to that of 18' can be provided on the passenger side window 16 if desired. The image receiving areas 18, 18' can comprise conventional smart or switchable glass that changes light transmission properties under the application of voltage. For example, when electrically charged, the image receiving areas 18, 18' change from transparent to translucent, blocking some (or all) wavelengths of light.

Once the image receiving area 18 is translucent, at least one projector 20, mounted adjacent to the top of the windshield 12, can project an image 22 (FIG. 2) to be displayed on the image receiving area 18. This image can be at least a portion of a rear view image obtained from a rear view camera 24 mounted to rear of the vehicle (see FIG. 3).

Figure 3:
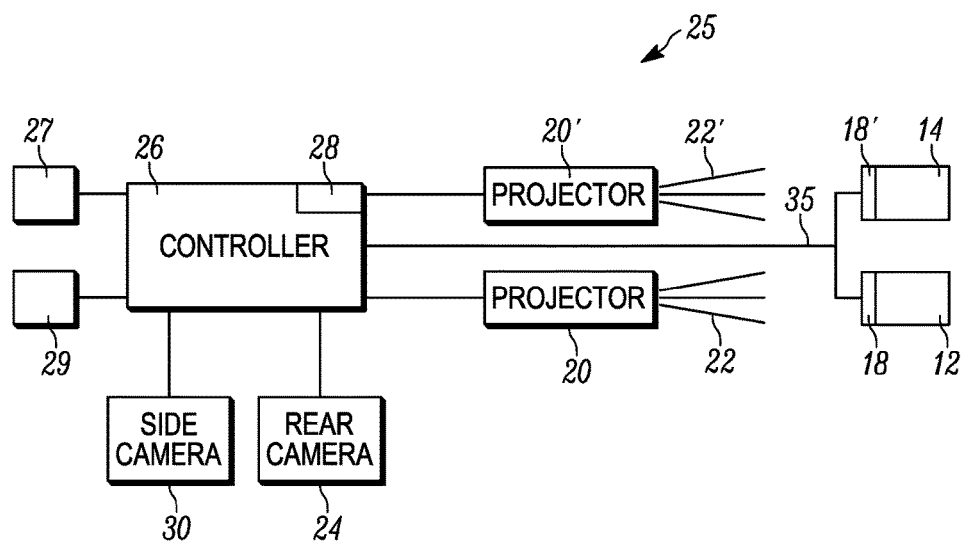
FIG. 3 is a schematic view of a system for displaying projected images on the image receiving areas in accordance with an embodiment.

FIG. 3 shows a system, generally indicated at 25, for displaying projected images in accordance with an embodiment. The system 25 includes a controller 26 having a processor circuit 28 that sends a voltage, via line 35, to the image receiving areas 18, 18' to change them from transparent to translucent. An image from the rear camera 24 is sent by the controller 26 to the projector(s) 20 to project the external rear image 22 on the image receiving area 18. The image 22 can be displayed continuously or only when the driver is looking up through the windshield 12 (as determined by a sensor 27 mounted on the dashboard that monitors a position of the driver's head or eyes).

In a similar manner, an image from a side camera 30 (preferably mounted to the exterior of vehicle near post 31) can be sent by the controller 26 to the projector 20' mounted on an interior portion 32 of the driver side door 33 of the vehicle 10. The projector 20' projects the external side image 22' to be displayed on the image receiving area 18'. An external passenger side image (not shown) can be projected on the passenger side window 16 in a similar manner if desired. The image 22' can be displayed continuously or only when the driver is looking towards the window 14 (as determined by a sensor 29 mounted on the door portion 32 that monitors a position of the drivers' head or eyes). The images 22 and 22' can be projected and displayed simultaneously and/or in series on demand, such as by user voice commands received by the controller 26.

The controller 26 can control switching of the voltage to the image receiving areas 18, 18' via signal line 35 to control when they are transparent or translucent. The driver may be able to control such switching by manually pressing a button or switch on the dashboard. The images 22 and 22' are projected only when the image receiving areas 18, 18' are translucent. Thus, due to the display system 25, no mirrors are required for the vehicle 10.

Figure 2:
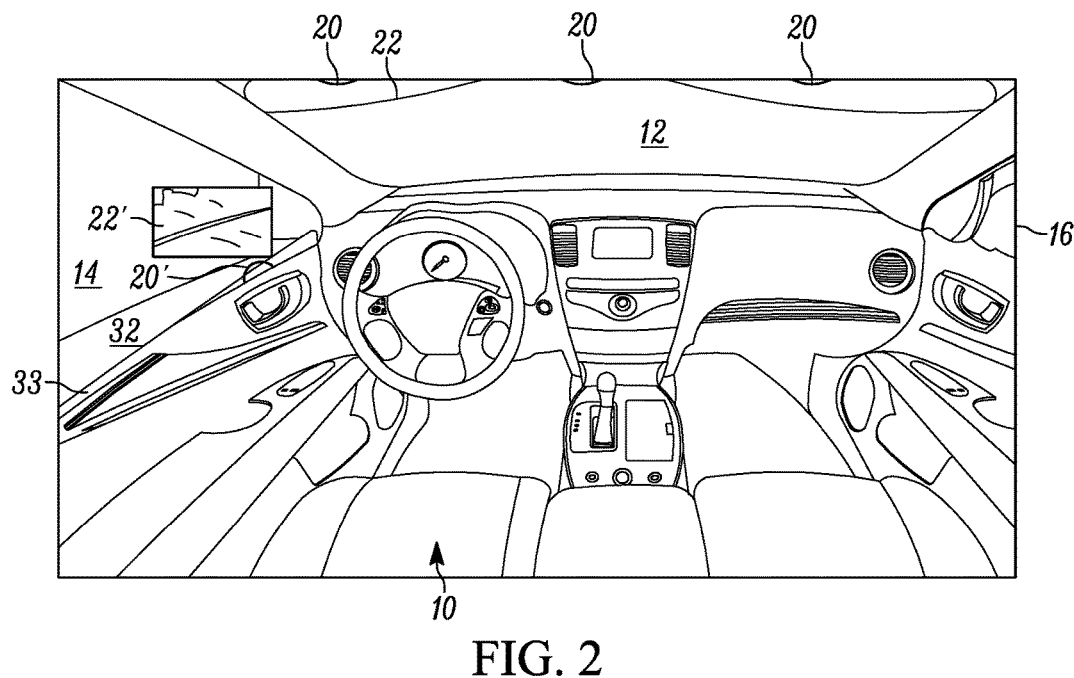
FIG. 2 is the interior view of a vehicle of FIG. 1, showing images on the image receiving areas in accordance with an embodiment.

Although the embodiment of FIGS. 1-3 requires no side mirrors, it can be appreciated that the projected image 22' could not be seen if the window 14 is down (open). Thus, in another embodiment, side view mirrors are provided on the vehicle and only the image receiving area 18 is provided on the windshield 12. This eliminates the need for the conventional rear view mirror for the vehicle 10.

Alternatively, to enable mirror-less driving, instead of providing the image receiving area 18' on the side window 14, the image receiving area 18 on the windshield 12 can be divided into more than one section. For example, the external side image 22' can be projected on the left side portion of the area 18 on the windshield and the central portion of area 18 can show image 22. If desired, the right side portion of the area 18 can show an image from a camera associated with the passenger side of the vehicle. Thus, in this embodiment, external side view information is available to the driver even with the side windows down (open).

Figure 4:
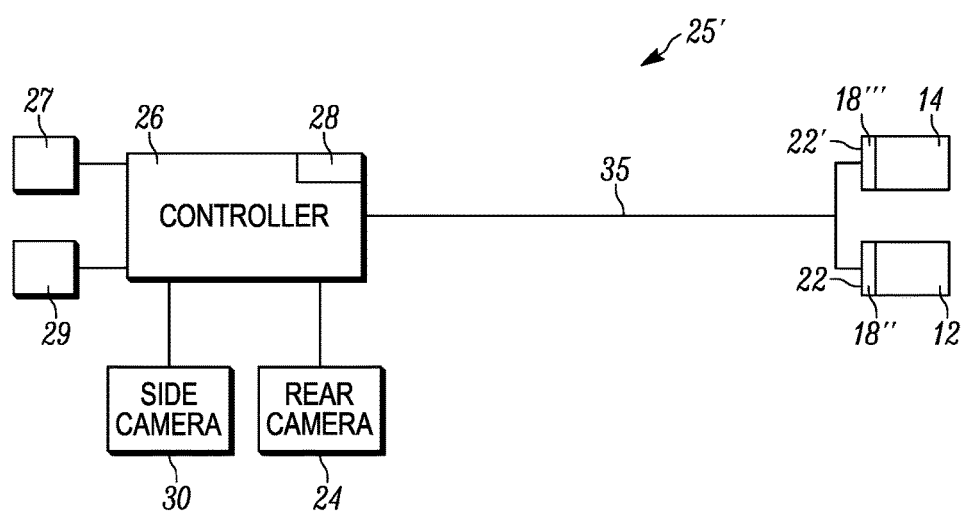
FIG. 4 is another embodiment of a system for displaying rear view and side view images to a driver of a vehicle, without the use of projectors.

With reference to FIG. 4, another embodiment of a display system 25' is shown. The system 25' is similar to that of FIG. 3, but does not require the projectors 20, 20' since the image receiving areas 18" and 18''' can comprise a display so as to directly display images 22 and 22', respectively. This can be accomplished by using conventional head-up display technology, or by providing the image receiving areas 18" and 18''' as transparent electronic displays embedded in, or associated with, the glass. Signal 35 from the controller 26 directs the display 18" and/or 18''' to show the images provided by the associated camera.

Figure 5:
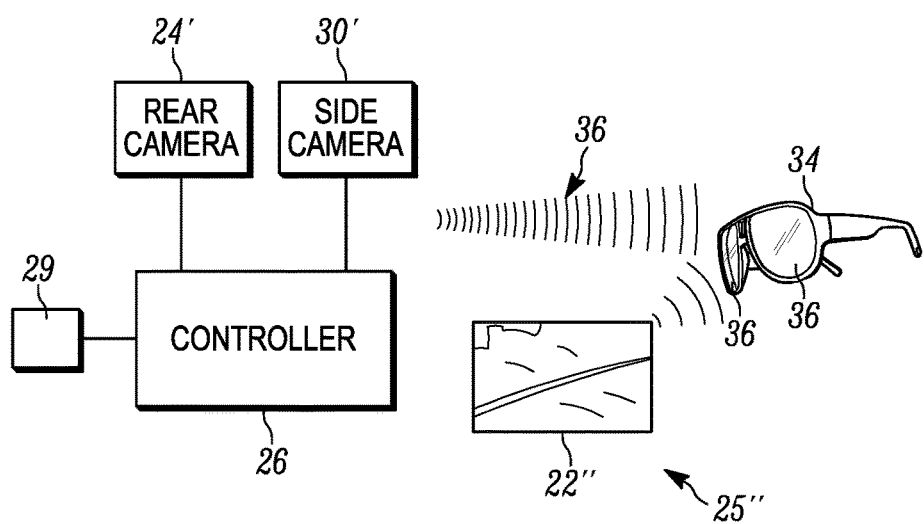
FIG. 5 is another embodiment of a system for displaying rear view and side view images to a driver of a vehicle using glasses and without the use of mirrors.

With reference to FIG. 5, yet another embodiment of a display system is shown, generally indicated at 25" that eliminates mirrors on a vehicle 10. Instead of providing the switchable glass as the display as in FIGS. 1-3, glasses 34, wearable by the driver, comprise the display. At least one side camera 30', preferably mounted to an external side of the vehicle 10, communicates in a wireless manner (e.g., RF communication 36) with the glasses 34. When the driver turns his or her head toward the driver side window 14 (FIG. 1), the sensor 29 senses this movement and the controller 26 instructs the camera 30' to send images 22" to the glasses 34. Alternatively, the sensor 29 can be part of the glasses 34 and the glasses can trigger the controller 26 or camera 30'. The glasses 34 enable the driver to see the images 22" preferably projected on the inside surface of lens 36 (an image receiving area) or through the lens 36 so as to be in front of the lens 36. The glasses 34 can be, for example, of the type disclosed in U.S. Patent Applicant No. 2013/0044042, the content of which is hereby incorporated by reference into this specification. If desired, a similar camera 30' can be provided external to the passenger side of the vehicle 10 so that the driver can see images associated with that side of the vehicle 10. Also, a rear camera 24' can communicate in a wireless manner with the glasses 34 so that the user can see external images associated with the rear of the vehicle 10. Thus, no mirrors are needed on the vehicle 10. Driver voice commands are also contemplated for controlling what view (rear, side, both rear and side) the driver sees through the glasses.

Instead of using the wireless communication between the cameras 24' and 30' and the glasses 34, a wired communication can be used. For example, the glasses 34 could have a wired connector that is plugged into a receiving connector located, for example, in the headrest. The headrest connector can be coupled to the controller 26 that is in communication with the cameras 24,' and 30'.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

The invention claimed is:

1. A display system for a vehicle, the vehicle having a windshield, a driver side window and a passenger side window, the system comprising:
   a rear view camera constructed and arranged to obtain images external to the vehicle and associated with a rear of the vehicle,
   an image receiving area associated with the windshield, and
   a controller associated with the rear view camera and constructed and arranged to cause the images to be displayed on the image receiving area so that a driver of the vehicle can see what is occurring at the rear of the vehicle without using a rear view mirror,
   at least one projector associated with the controller and constructed and arranged to project the images to the image receiving area so as to be displayed thereon,
   at least one side view camera constructed and arranged to obtain images external to the vehicle and associated with a side of the vehicle,
   a second image receiving area associated with the vehicle,
   wherein the controller is associated with the at least one side view camera and constructed and arranged to cause the images obtained by the side view camera to be displayed on the second image receiving area so that a driver of the vehicle can see what is occurring at the side of the vehicle without using a side view mirror,
   at least one additional projector associated with the controller and constructed and arranged to project the images obtained by the side view camera to the second image receiving area so as to be displayed thereon, and
   in combination with the vehicle, wherein the second image receiving area is associated with the driver side window and the at least one additional projector is mounted on a driver side door of the vehicle.

2. The system for claim 1, wherein the image receiving area is an electronic display.

3. The system of claim 1, wherein the controller is constructed and arranged to send the voltage to the image receiving area to cause the image receiving area to change from transparent, which allows detailed images to pass through, to translucent, which does not allow detailed images to pass through.

4. The system of claim 1, in combination with the vehicle, wherein the image receiving area is disposed at a top of the windshield and the at least one projector is mounted adjacent to the top of the windshield.

5. The system of claim 1, further comprising a sensor to monitor a position of a head or eyes of the driver, the controller being constructed and arranged to send the images to be displayed on the second image receiving area only when the driver is looking towards the second image receiving area based on the position of the head or eyes.

6. A method of displaying external information to a driver of a vehicle, the vehicle having a windshield and a rear view camera, the method comprising the step of:
   providing a first image receiving area,
   obtaining images external to the vehicle and associated with a rear of the vehicle from the rear view camera,
   displaying the images on the first image receiving area so that a driver of the vehicle can see what is occurring at the rear of the vehicle without using a rear view mirror,
   providing a second image receiving area,
   obtaining images external to the vehicle and associated with a side of the vehicle from the side view camera,
   displaying the images associated with the side of the vehicle on the second image receiving area so that a driver of the vehicle can see what is occurring at the side of the vehicle without using a side view mirror,
   wherein the first image receiving area is provided to be associated with the windshield, and the second image receiving area is provided so as to be associated with at least a driver side window of the vehicle,
   wherein the first image receiving area is provided as switchable glass that changes from transparent, which allows detailed images to pass through, to translucent, which does not allow detailed images to pass through, upon the application of voltage, the method further comprising:
   applying voltage to the switchable glass to make the switchable glass translucent, and thereafter:
   projecting the images on the translucent switchable glass so as to be displayed thereon.

* * * * *